(12) United States Patent
Wong et al.

(10) Patent No.: US 12,196,314 B2
(45) Date of Patent: Jan. 14, 2025

(54) ACTUATOR SYSTEM AND SEGMENTED PULLEY TRANSMISSION INCLUDING THE SAME

(71) Applicant: 1783590 ONTARIO INC., Toronto (CA)

(72) Inventors: Anthony Wong, Scarborough (CA); Jaroslaw Lutoslawski, Bradford (CA); Sarah Jean Fondyga, Toronto (CA)

(73) Assignee: 1783590 ONTARIO INC., Toronto (CA)

( * ) Notice: Subject to any disclaimer, the term of this patent is extended or adjusted under 35 U.S.C. 154(b) by 203 days.

(21) Appl. No.: 17/609,750

(22) PCT Filed: Nov. 29, 2019

(86) PCT No.: PCT/CA2019/051713
§ 371 (c)(1),
(2) Date: Nov. 8, 2021

(87) PCT Pub. No.: WO2020/223787
PCT Pub. Date: Nov. 12, 2020

(65) Prior Publication Data
US 2022/0228650 A1 Jul. 21, 2022

Related U.S. Application Data

(60) Provisional application No. 62/845,389, filed on May 9, 2019.

(51) Int. Cl.
*F16H 9/10* (2006.01)
*F16H 63/06* (2006.01)

(52) U.S. Cl.
CPC .............. *F16H 9/10* (2013.01); *F16H 63/062* (2013.01)

(58) Field of Classification Search
CPC . F16H 9/10; F16H 63/062; F16H 9/24; F16H 2063/3053; F16H 2063/305;
(Continued)

(56) References Cited

U.S. PATENT DOCUMENTS 2,782,649 A 2/1957 Shortland
3,861,227 A 1/1975 Hunt
(Continued)

FOREIGN PATENT DOCUMENTS

AT 516847 B1 9/2016
DE 102012008041 A1 10/2013
(Continued)

OTHER PUBLICATIONS

English Translated pdf document of FR 429909A from the EPO (Year: 1911).*
(Continued)

*Primary Examiner* — Michael R Mansen
*Assistant Examiner* — Katelynne R Burrell
(74) *Attorney, Agent, or Firm* — Faegre Drinker Biddle & Reath LLP

(57) ABSTRACT

An actuator system for moving a plurality of pulley segments of a segmented pulley between an engaged region and a disengaged region is provided. The actuator system comprises: a deflector configured to rotate at least between a first position and a second position; and a plurality of followers, each of the followers comprising a protrusion configured to engage the deflector to move the respective one of the pulley segments between the engaged region and the disengaged region, wherein the deflector is configured to move between the first position and the second position to selectively engage the plurality of followers and direct each of the followers between an engaged position and a disengaged position, to move the plurality of pulley segments between (Continued)

the engaged region and the disengaged region. A segmented pulley transmission comprising the actuator system is further provided.

16 Claims, 6 Drawing Sheets

(58) Field of Classification Search
CPC . F16H 55/12; F16H 55/52; F16H 9/06; F16H 9/12; F16H 2200/0034; B62M 9/04
USPC ...................................................... 474/49, 54
See application file for complete search history.

(56) References Cited

U.S. PATENT DOCUMENTS

| | | | |
|---|---|---|---|
| 4,634,406 A | 1/1987 | Hufschmid | |
| 5,443,423 A | 8/1995 | Ha | |
| 5,637,046 A | 6/1997 | Ha | |
| 5,980,412 A * | 11/1999 | Smith | F16H 35/008 |
| | | | 74/64 |
| 6,267,699 B1 * | 7/2001 | Gruich | B62M 9/14 |
| | | | 474/49 |
| 6,431,573 B1 | 8/2002 | Lerman | |
| 6,749,531 B2 | 6/2004 | Kang | |
| 8,083,621 B1 | 12/2011 | Lane | |
| 8,257,209 B1 | 9/2012 | Lane | |
| 8,753,236 B2 | 6/2014 | Wong | |
| 9,334,944 B2 * | 5/2016 | Appleton | F16H 9/10 |
| 9,625,014 B2 | 4/2017 | Wong | |
| 9,816,598 B2 * | 11/2017 | Wong | F16H 9/06 |
| 10,167,055 B2 | 1/2019 | Magee | |
| 10,989,281 B2 * | 4/2021 | Allen | B62M 9/10 |
| 2002/0084618 A1 | 7/2002 | Lerman | |
| 2009/0124440 A1 | 5/2009 | Milne | |
| 2009/0137353 A1 * | 5/2009 | Serkh | F16H 55/54 |
| | | | 474/49 |
| 2011/0045928 A1 * | 2/2011 | Wong | F16H 9/04 |
| | | | 474/47 |
| 2013/0267362 A1 | 10/2013 | Gheciu | |
| 2014/0155207 A1 * | 6/2014 | Wong | F16H 9/24 |
| | | | 474/163 |
| 2014/0248982 A1 | 9/2014 | Schuster | |
| 2016/0169363 A1 | 6/2016 | Wong | |
| 2018/0135731 A1 * | 5/2018 | Takagi | F16H 7/08 |
| 2020/0377174 A1 * | 12/2020 | Allen | B62M 9/14 |

FOREIGN PATENT DOCUMENTS

| | | |
|---|---|---|
| EP | 3251938 | 12/2017 |
| FR | 429909 A * | 10/1911 |
| JP | 2014513254 | 5/2014 |
| KR | 100978626 B1 | 8/2010 |
| KR | 20140051852 | 5/2014 |
| KR | 101744544 B1 | 6/2017 |
| WO | 2012145824 | 11/2012 |

OTHER PUBLICATIONS

PCT International Preliminary Report on Patentability for PCT/CA2019/051713, Dated Nov. 2, 2021.

* cited by examiner

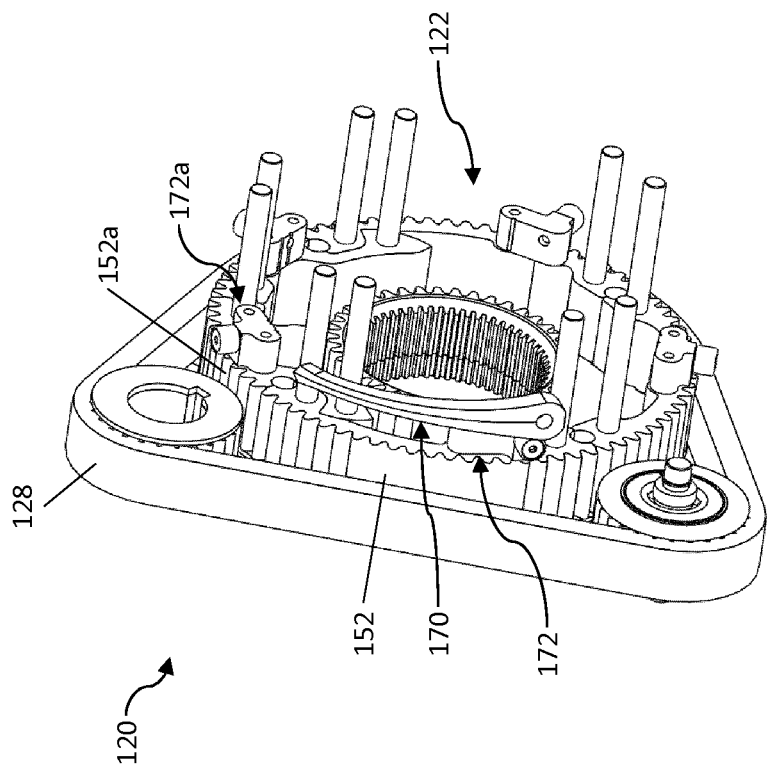
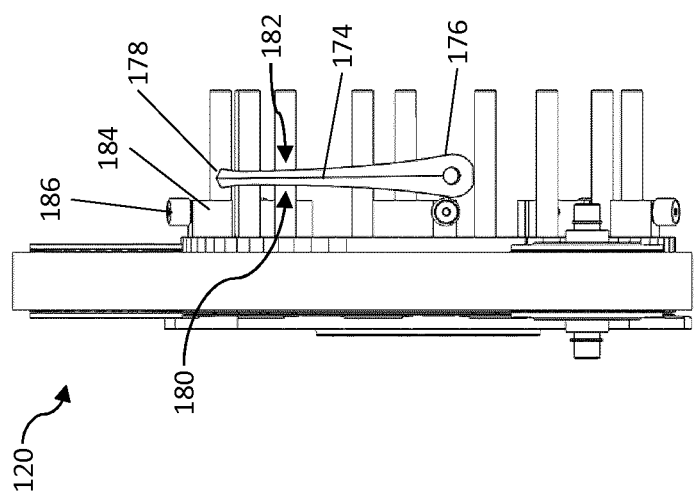
FIG. 2b
FIG. 2a

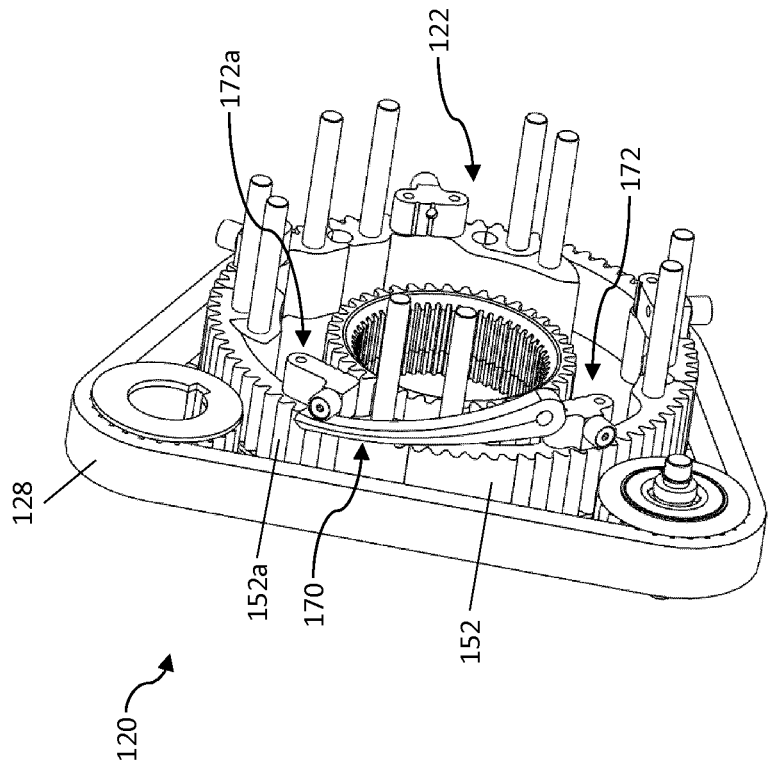
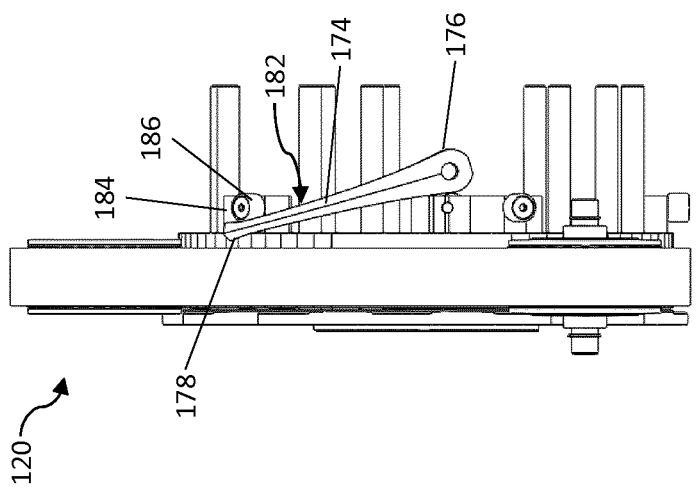
FIG. 3b
FIG. 3a

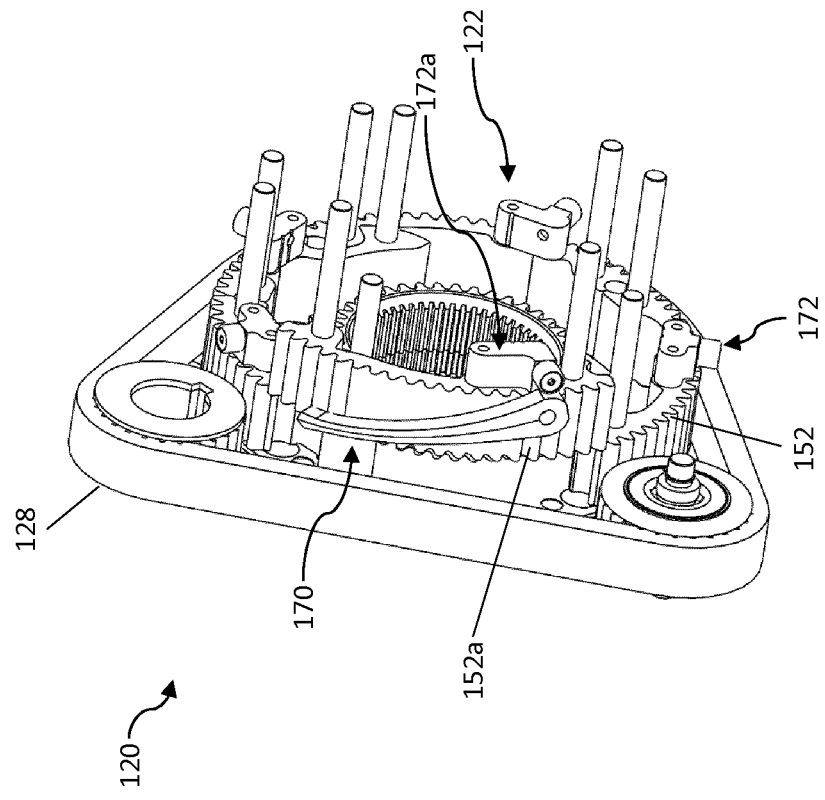
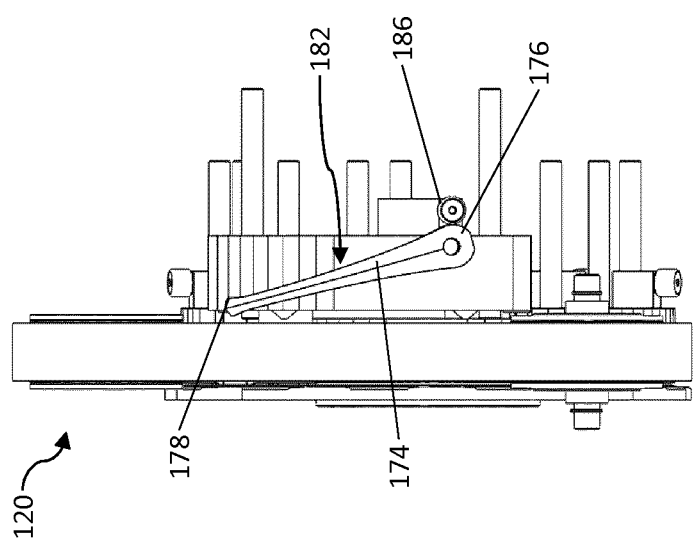
FIG. 5b
FIG. 5a

ACTUATOR SYSTEM AND SEGMENTED PULLEY TRANSMISSION INCLUDING THE SAME

CROSS-REFERENCE TO RELATED APPLICATION

This application is the US national stage entry of PCT/CA2019/051713 filed on Nov. 29, 2019, which claims the benefit of U.S. Provisional Patent Application No. 62/845,389 filed on May 9, 2019, and titled ACTUATOR SYSTEM AND SEGMENTED PULLEY TRANSMISSION INCLUDING THE SAME, the entireties of each of which are specifically incorporated herein by reference.

FIELD

The subject disclosure generally relates to transmissions, and more particularly to an actuator system for a segmented pulley and to a segmented pulley transmission including the same.

BACKGROUND

Transmissions are well known and can be used to change the ratio between rotating elements in a power train. Potential applications for transmissions are numerous and include motor vehicles, human-powered vehicles, maritime craft and heavy machinery, such as pumps, turbines, mixers, winches, centrifuges and shredders.

Clutchless multi-ratio transmissions allow the ratio between rotating elements to be changed while the transmission is under load. Certain mechanical problems can affect clutchless multi-ratio transmissions that limit their widespread utilization; specifically, the ability of such transmission systems to function at high speeds or under significant loads effectively and efficiently in practical applications. In addition, ratcheting, slippage, and tensioning problems can limit the commercial viability of such transmissions by decreasing their reliability, decreasing their efficiency and increasing wear. Accordingly, segmented pulley transmissions have been developed to reduce or alleviate at least some of these mechanical problems.

For example, U.S. Pat. No. 8,753,236 to Wong et al. discloses a segmented pulley transmission, wherein a pulley assembly is mounted on an axle. The pulley assembly includes a core pulley having a first set of mating features on a peripheral surface thereof and a pulley segment set that comprises a number of pulley segments slidably mounted in the pulley assembly and arranged in a ring concentric with the core pulley. The pulley segments are individually actuatable into and out of the pulley assembly. The pulley segments have a second set of mating features on a peripheral surface thatching the first set of mating features. An endless drive member has corresponding mating features on an inside surface for engaging the first and second sets of mating features of the core pulley and the pulley segments in an engaging position. Contact between the endless drive member and the core pulley defines a contact zone. An actuator actuates the pulley segments between the engaging and non-engaging positions when the pulley segments are outside of the contact zone.

U.S. Pat. No. 9,816,598 to Wong discloses a key pulley segment for a segmented pulley transmission that is either first or last in a pulley segment set to engage an endless member. The first or last key segment teeth to engage or disengage the endless member. respectively, are shortened or completely trimmed, and the adjacent pulley segment to the key segment is elongated such that a portion of the tooth profile extends toward the key segment. The shortened tooth or teeth and elongated adjacent segment together allow for many pulley segments to be designed as key segments. Completely trimmed teeth may be engineered to create a supporting surface for the endless member on the key segment. The elongated adjacent segment may have an extending portion which slidably mates with the supporting surface of the key segment, thereby receiving radial support therefrom. Multiple pulley segments from different pulley segment sets may be connected or constructed to move together in a unified stack. Unified stacks may be moved by way of a cam or roller-cam system. Chassis-mounted cams engage the rollers outside of the contact zone and, via roller-arms, individual segments of a unified'stack are moved into or out of engagement. Rollers may be actuated into and out of engagement with the cams by electromagnets, fixable mounted in an array.

While the contributions of known segmented pulley transmissions are laudable, improvements and/or alternatives are generally desired. It is therefore an object to provide a novel actuator system for moving a plurality of pulley segments of a segmented pulley and a novel segmented pulley transmission for rotatably coupling a first rotatable member and a second rotatable member in a power train.

SUMMARY

It should be appreciated that this summary is provided to introduce a selection of concepts in a simplified form that are further described below in the detailed description of embodiments. This summary is not intended to be used to limit the scope of the claimed subject matter.

Accordingly, in one aspect there is provided an actuator system for moving a plurality of pulley segments of a segmented pulley between an engaged region and a disengaged region, the actuator system comprising: a deflector configured to rotate at least between a first position and a second position; and a plurality of followers, each of the followers comprising a protrusion configured to engage the deflector to move the respective one of the pulley segments between the engaged region and the disengaged region, wherein the deflector is configured to move between the first position and the second position to selectively engage the plurality of followers and direct each of the followers between an engaged position and a disengaged position, to move the plurality of pulley segments between the engaged region and the disengaged region.

In one or more embodiment, each of the followers further comprises a body for securing the follower to the respective one of the pulley segments, and the protrusion extends from the body. In one or more other embodiments, each of the followers is integrally formed with the respective one of the pulley segments, and the protrusion extends directly from the respective one of the pulley segments.

In one or more embodiments, the deflector may be configured to rotate about a generally radial axis of the segmented pulley.

In one or more embodiments, the deflector may define at least one cam surface for engaging the protrusion. The at least one cam surface may comprise an engaging cam surface and a disengaging cam surface, wherein the engaging cam surface is configured to contact the protrusions of the plurality of followers and direct each of the followers from the disengaged position and the engaged position, and wherein the disengaging cam surface is configured to contact the protrusions of the plurality of followers and direct each of the followers from the engaged position to the disengaged position.

In one or more embodiments, the deflector may be further configured to rotate to a neutral position where the deflector will not engage the plurality of followers during rotation of the segmented pulley. The neutral position may be located between the first position and the second position.

In one or more embodiments, the deflector may comprise an elongate body extending between a root and a distal tip, and the deflector may be configured to rotate at the root, such that the distal tip moves in a generally axial direction of the segmented pulley.

In one or more embodiments, the protrusion may extend in a generally radial direction of the segmented pulley and may be axially offset from an outer peripheral surface of the segmented pulley. The protrusion may be a roller that is configured to engage the deflector by rolling along the deflector.

In one or more embodiments, the actuator system may further comprise an electromagnetic actuator for rotating the deflector between at least the first position and the second position. The electromagnetic actuator may comprise at least one solenoid.

According to another aspect, there is provided a segmented pulley transmission for rotationally coupling a first rotatable member and a second rotatable member, the segmented pulley transmission comprising: a first pulley assembly for coupling to the first rotatable member, the first pulley assembly comprising a first pulley and a second pulley concentric with the first pulley, the second pulley being a segmented pulley having a plurality of pulley segments that are individually moveable between an engaged region and a disengaged region; a second pulley assembly for coupling to the second rotatable member and spaced apart from the first pulley assembly; an endless member engaging the first pulley assembly and the second pulley assembly and extending therebetween, to rotationally couple the first pulley assembly and the second pulley assembly; and an actuator system as defined in any of the above paragraphs of this Summary and coupled to the plurality of pulley segments of the second pulley for selectively moving the plurality of pulley segments between the engaged region and the disengaged region.

In one or more embodiments, the actuator system may further comprise an idler pulley for engaging the endless member and configured to adjust slack in the endless member.

BRIEF DESCRIPTION OF THE DRAWINGS

Embodiments will now be described more fully with reference to the accompanying drawings, in which:

FIGS. 2a and 2b are simplified side and axonometric views, respectively, of the segmented pulley transmission of FIGS. 1a and 1b, with the deflector in a neutral position;

FIGS. 3a and 3b are simplified side and axonometric views, respectively, of the segmented pulley transmission of FIGS. 1a and 1b, with the deflector in a second position;

FIGS. 5a and 5b are simplified side and axonometric views, respectively, of the segmented pulley transmission of FIGS. 1a and 1b, showing the transitioned pulley segment of FIGS. 4a and 4b in the disengaged region.

DETAILED DESCRIPTION OF EMBODIMENTS

Figure 1B:
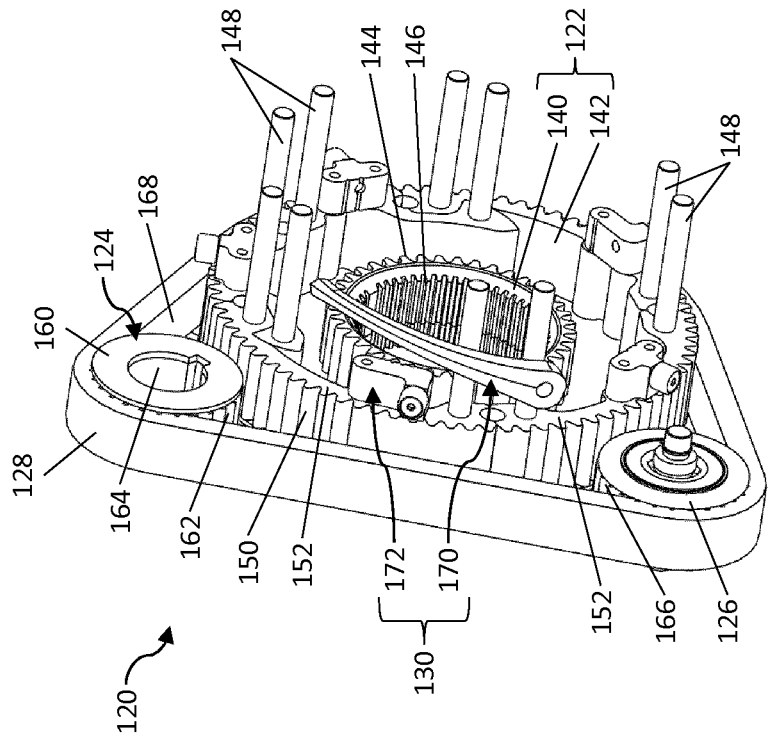
FIGS. 1a and 1b are simplified side and axonometric views, respectively, of a segmented pulley transmission with an actuator system having a deflector in a first position.

The foregoing summary, as well as the following detailed description of certain embodiments will be better understood when read in conjunction with the accompanying drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising," "having" or "including" an element or feature or a plurality of elements or features having a particular property may further include additional elements or features not having that particular property. Also, it will be appreciated that the terms "comprises," "has" and "includes" mean "including but not limited to" and the terms "comprising," "having" and "including" have equivalent meanings.

As used herein, the term "and/or" can include any and all combinations of one or more of the associated listed elements or features.

It will be understood that when an element or feature is referred to as being "on," "attached" to, "connected" to, "coupled" with, "engaged" with, "contacting," etc. another element or feature, that element or feature can be directly on, attached to, connected to, coupled with or contacting the other element or feature or intervening elements may also be present. In contrast, when an element or feature is referred to as being, for example, "directly on," "directly attached" to, "directly connected" to, "directly coupled" with, "directly engaged" with or "directly contacting" another element of feature, there are no intervening elements or features present. Additionally, when an element or feature is referred to as being "attached" to, "connected" to, "coupled" with, "engaged" with, "contacting," etc. another element or feature, it should be understood as not necessarily excluding further elements or features being attached to, connected to, couple with, engaged with, contacting, etc. those same elements or features. For example, in some instances, elements may be coupled in a one-to-one relationship; in other instances, a single element may be coupled to a plurality of other elements, or vice versa.

It will be understood that spatially relative terms, such as "under," "below," "lower," "over," "above," "upper," "front," "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and/or implementation of the subject matter according to the subject disclosure. Thus, the phrases "an example," "another example," and similar language throughout the subject disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to."

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within engineering tolerances that would be readily appreciated by a person skilled in the art.

Figure 1A:
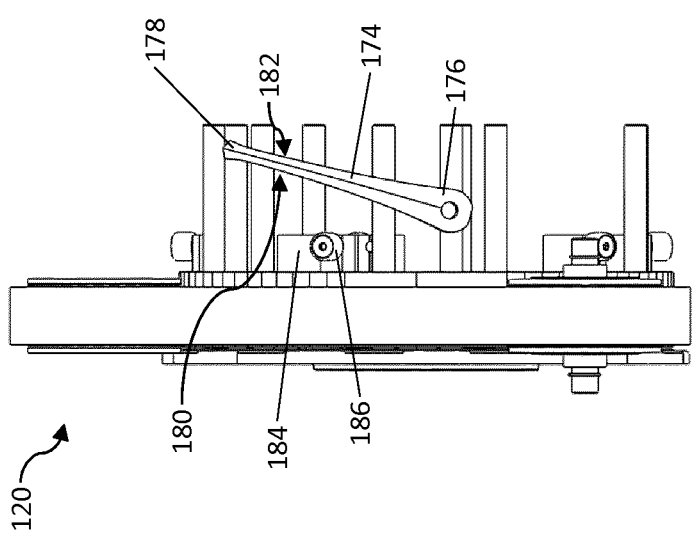
Figure 4B:
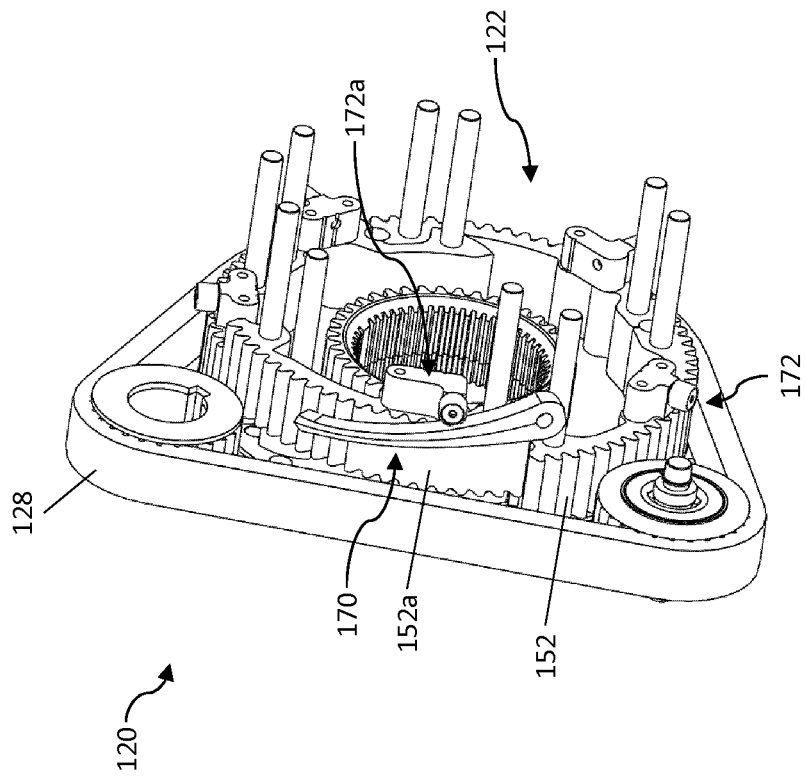
FIGS. 4a and 4b are simplified side and axonometric views, respectively, of the segmented pulley transmission of FIGS. 1a and 1b, showing the actuator system transitioning a pulley segment from an engaged region to a disengaged region.
Figure 4A:
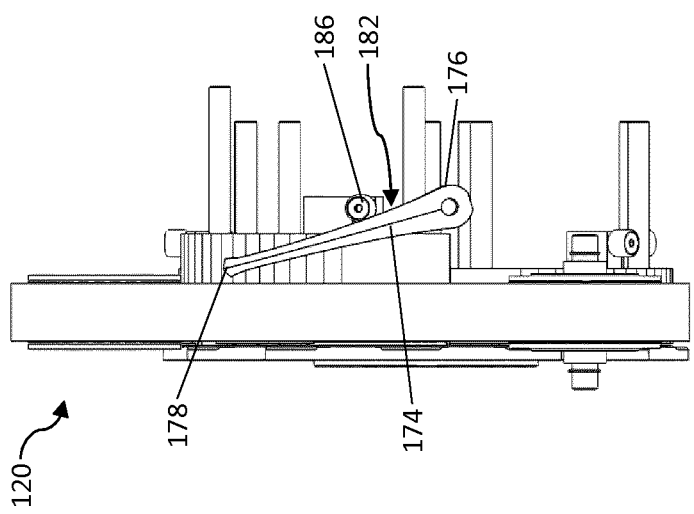
Figure 6:
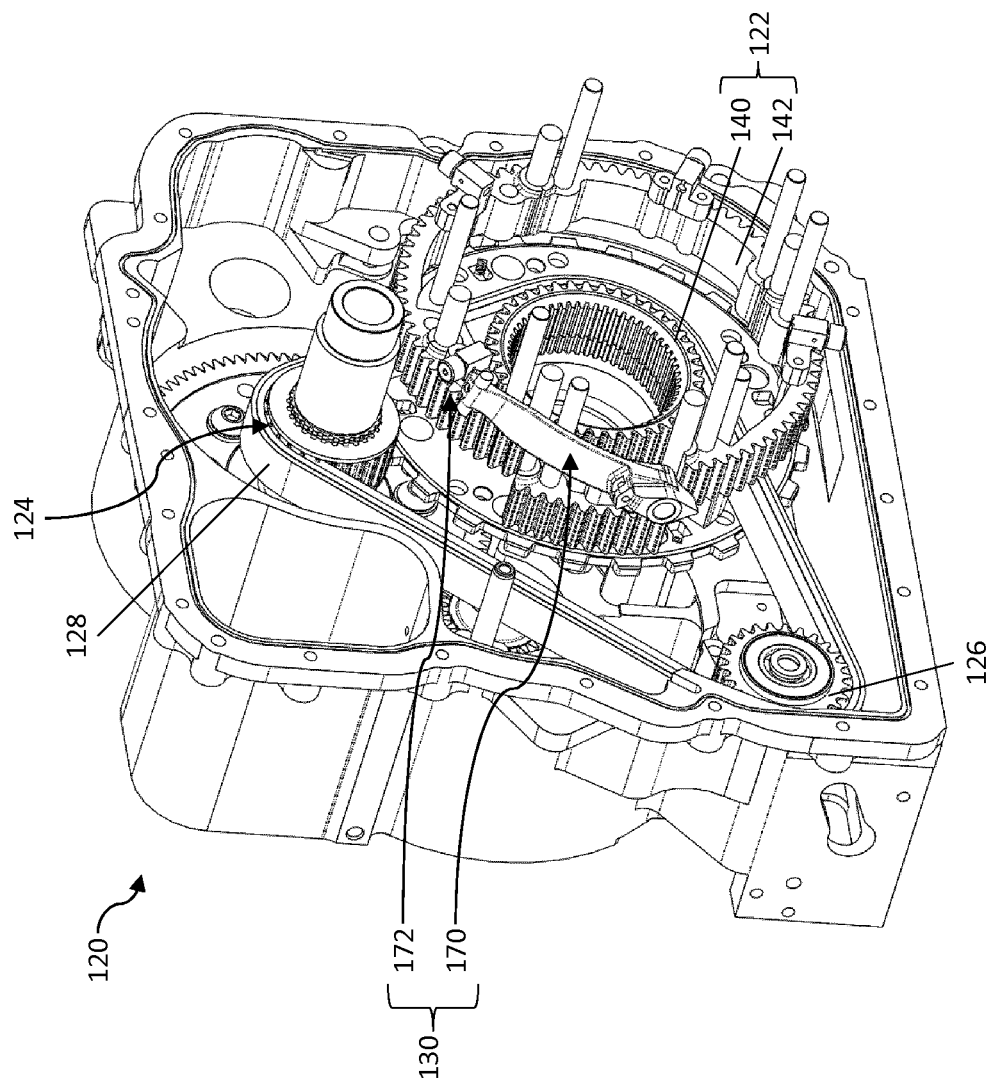
FIG. 6 is an axonometric view of the segmented pulley transmission of FIG. 1a and 1b, with a portion of the external housing omitted.

FIG. 6 shows a segmented pulley transmission, generally identified by reference character 120. As will be appreciated, a portion of an external housing of the segmented pulley transmission 120 has been, omitted in FIG. 6 to view the interior. FIGS. 1a and 1b also show the segmented pulley transmission 120 and have been simplified to facilitate understanding of this description and certain elements of the segmented pulley transmission 120 have been omitted, such as the external housing. In some embodiments, the segmented pulley transmission 120 may include elements such as those shown and described in PCT International Application No. PCT/CA2018/051475 filed on Nov. 20, 2018, and titled PULLEY ASSEMBLY FOR A SEGMENTED PULLEY TRANSMISSION AND ACTUATOR SYSTEM FOR THE SAME. the relevant portions of which are incorporated heroin by reference.

The segmented pulley transmission 120 is configured to rotationally couple a first rotating element and a second rotating element in a power train (not shown) and is configured to change the ratio between the first and second rotating elements. In some embodiments, the first rotating element is a driven axle in the power train and the second rotating element is a driving axle in the power train, or vice versa. The segmented pulley transmission 120 comprises a first pulley assembly 122, a second pulley assembly 124, an idler pulley 126, an endless member 128 and an actuator system 130. As will be appreciated, the endless member 128 is shown as a schematic representation with mating features omitted. The first pulley assembly 122, the second pulley assembly 124 and the idler pulley 126 are all spaced apart from each other. The endless member 128 extends between and rotationally couples the first pulley assembly 122, the second pulley assembly 124 and the idler pulley 126. The actuator system 130 is coupled to the first pulley assembly 122 and may be further coupled to the external housing of the segmented pulley transmission 120. During installation of the segmented pulley transmission 120, the first pulley assembly 122 is coupled to the first rotating element in the power train and the second pulley assembly 124 is coupled to the second rotating element in the power train.

The first pulley assembly 122 is configured to be coupled to the first rotating element in the power train. In some embodiments, the first pulley assembly 122, or a portion thereof, is integrally formed with the first rotating element in the power train. The first pulley assembly 122 is configured to engage the endless member 128 during rotational operation. The first pulley assembly 122 is rotatable about and concentric with a first axis of rotation. The first pulley assembly 122 comprises a first pulley 140 and a second pulley 142. Both the first pulley 140 and the second pulley 142 are configured for continuous rotational operation with the endless member 128. During a full rotation of the first pulley assembly 122 about the first axis of rotation, either of the first pulley 140 and the second pulley 142 may continuously engage the endless member 128. The second pulley 142 is concentric with the first pulley 140 and is movable between an engaged region and a disengaged region, as described below. The second pulley 142 is configured to surround the first pulley 140, when located in the engaged region.

In the context of the subject disclosure, the "engaged region" is a region wherein elements of the first pulley assembly 122 will engage the endless member 128 during rotational operation of the first pulley assembly 122, when those elements are unsheltered or unobstructed by other elements of first pulley assembly 122. In contrast, the "disengaged region" is a region wherein elements of the first pulley assembly 122 will not engage the endless member 128 during rotational operation of the first pulley assembly 122, regardless of their exposure or the position of the other elements of the first pulley assembly 122. In the subject embodiment, it will be appreciated that the first pulley 140 is permanently located within the engaged region, as the first pulley 140 will always engage the endless member 128 when unobstructed by other elements during rotational operation of the first pulley assembly 122. In contrast, the second pulley 142 will only be located in the engaged region when moved into a plane defined by the endless member 128.

The first pulley 140 is configured to be coupled to the first rotating element in the power train. In some embodiments, the first pulley 140 is integrally formed with the first rotating element in the power train. The first pulley 140 is configured to engage the endless member 128, when the first pulley 140 is located in the engaged region. The first pulley 140 is rotatable about and concentric with the first axis of rotation of the first pulley assembly 122. The first pulley 140 includes an outer peripheral surface 144 for engaging the endless member 128. The outer peripheral surface 144 is generally circular and may comprise a plurality of outer mating features, for engaging corresponding mating features on the endless member 128. In some embodiments, the outer mating features are teeth. The first pulley 140 further comprises an inner peripheral surface 146 that is configured to be coupled to the first rotating element of the power train. The inner peripheral surface 146 is generally circular and may comprise a plurality of inner mating features, for coupling to the first rotating element in the power train. In some embodiments, the inner mating features are at least one of keys, teeth or the like. In the subject embodiment, the first pulley 140 comprises a unitary construction. In the subject embodiment, the first pulley 140 is a core pulley of the first pulley assembly 122. That is, the first pulley 140 is the centermost or smallest diameter pulley in the first pulley assembly 122. In other embodiments, the first pulley 140 may be another pulley in the first pulley assembly 122, such as an intermediate pulley that is located between two concentric pulleys in the first pulley assembly 122. In some embodiments, the first pulley 140 may be a segmented pulley.

The second pulley 142 is configured to be coupled to the first rotating element in the power train. The segmented pulley transmission 120 may comprise a plurality of connecting rods 148 for coupling the second pulley 142 to the first rotating element in the power train. In some embodiments, the second pulley 142 is coupled to the first rotating element via the connecting rods 148 and a hub, such as those shown and described in PCT International Application No. PCT/CA2018/051475. The second pulley 142 is configured to engage the endless member 128, when the second pulley 142 is located in the engaged region. The second pulley 142 is rotatable about and concentric with the first axis of rotation of the first pulley assembly 122. The second pulley 142 includes an outer peripheral surface 150 for engaging the endless member 128. The outer peripheral surface 150 is generally circular and may comprise a plurality of outer mating features, for engaging corresponding mating features on the endless member 128. In some embodiments, the outer mating features are teeth. The second pulley 142 is a segmented pulley and comprises a plurality of pulley segments 152. The pulley segments 152 are circularly arranged to form the second pulley 142.

The plurality of pulley segments 152 is configured to engage the endless member 128. Accordingly, each of the pulley segments 152 includes a body that defines a portion of the outer peripheral surface 150 of the second pulley 142. The pulley segments 152 are configured to be sequentially movable between the engaged region and the disengaged region to transition the endless member between the first pulley 140 and the second pulley 142. In the subject embodiment, the pulley segments 152 are configured to be individually movable between the engaged region and the disengaged region. In other embodiments, one or more subsets of the pulley segments 152 are configured to be collectively moved between the engaged region and the disengaged region. For example, in some embodiments, two or more of the pulley segments 152 are configured to be movable together between the engaged region and the disengaged region.

The second pulley assembly 124 is configured to be coupled to the second rotating element in the power train. In some embodiments, the second pulley assembly 124, or a portion thereof, is integrally formed with the second rotating element in the power train. The second pulley assembly 124 is configured to engage the endless member 128. The second pulley assembly 124 is rotatable about and concentric with a second axis of rotation. In the subject embodiment, the second pulley assembly 124 comprises a single fixed pulley 160. In other embodiments, the secondary pulley assembly 124 is adjustable and may comprise a plurality of pulleys, such as the first pulley 140 and/or the second pulley 142 described above. The fixed pulley 160 is rotatable about and concentric with the second axis of rotation. The fixed pulley 160 includes an outer peripheral surface 162 for engaging the endless member 128. The outer peripheral surface 162 is generally circular and may comprise a plurality of outer mating features, for engaging corresponding mating features on the endless member 128. In some embodiments, the outer mating features are teeth. The fixed pulley 160 further comprises an inner peripheral surface 164 that is configured to be coupled to the second rotating element of the power train. The inner peripheral surface 164 is generally circular and, in some embodiments, comprises a plurality of inner mating features. In some embodiments, the inner mating features are at least one of keys, teeth and the like.

The idler pulley 126 is configured to control slack in the endless member 128 between the first pulley assembly 122 and the second pulley assembly 124. The idler pulley 126 is rotatable about and concentric with a third axis of rotation, and is movable within the segmented pulley transmission 120 to control slack in the endless member 128. As will be appreciated, controlling slack in the endless member 128 may help to control tension in the endless member 128 and/or may help to align the endless member 128 with the outer mating features of the first pulley assembly 122 and the second pulley assembly 124. The idler pulley 126 can be moved away from the first pulley assembly 122 and/or the second pulley assembly 124 to reduce slack in the endless member 128. Alternatively, the idler pulley 126 can be moved towards the first pulley assembly 122 and/or the second pulley assembly 124 to provide slack in the endless member 128. The idler pulley 126 is configured to engage the endless member 128. The idler pulley 126 includes an outer peripheral surface 166 for engaging the endless member 128. The outer peripheral surface 166 is generally circular and may comprise a plurality of outer mating features, for engaging corresponding mating features on the endless member 128. In some embodiments, the outer mating features are teeth.

The endless member 128 is configured to rotationally couple the first pulley assembly 122, the second pulley assembly 124 and the idler pulley 126. The endless member 128 extends between the first pulley assembly 122, the second pulley assembly 124 and the idler pulley 126. The endless member 128 includes an inner peripheral surface 168 that is configured to engage the outer peripheral surfaces of the first pulley 140, the second pulley 142, the fixed pulley 160 and the idler pulley 126, respectively. Although the endless member 128 is shown in the figures as a schematic representation without any mating features, it will be appreciated that mating features such as teeth and/or holes may be included on at least the inner peripheral surface 168 of the endless member 128. In some embodiments, the inner peripheral surface 168 includes a plurality of complementary mating features for engaging the outer mating features on the outer peripheral surfaces of the first pulley 140, the second pulley 142, the fixed pulley 160 and/or the idler pulley 126. In other embodiments, the inner peripheral surface 168 may not include any mating features and may be generally smooth, and in such embodiments the inner peripheral surface 168 may engage the first pulley 140, the second pulley 142, the fixed pulley 160 and/or the idler pulley 126. As will be appreciated, the endless member 128 may comprise a chain, a belt or other suitable type of endless member.

The actuator system 130 is configured to move the plurality of pulley segments 152 of the second pulley 142 between the engaged region and the disengaged region. The actuator system 130 comprises a deflector 170 and a plurality of followers 172. Each of the followers 172 is coupled to a respective one of the pulley segments 152. The deflector 170 is rotatably coupled to the external housing of the segmented pulley transmission 120.

The deflector 170 is configured to rotate between a first position (shown in FIGS. 1a and 1b) and second position (shown in FIGS. 3a and 3b). The deflector 170 is configured to rotate about a generally radial axis of the second pulley 142. In the first position, the deflector 170 is aligned to engage the plurality of followers 172 during rotational operation of the second pulley 142, to move the plurality of pulley segments 152 from the disengaged region to the engaged region. In the second position, the deflector 170 is aligned to engage the plurality of followers 172 during rotational operation of the second pulley 142, to move the plurality of pulley segments 152 from the engaged region to the disengaged region. In some embodiments, the deflector 170 may be further configured to rotate to a neutral position (show in FIGS. 2a and 2b), In the neutral position, the deflector 170 is aligned to avoid engaging the plurality of followers 172 during rotational operation of the second pulley 142, to avoid moving the plurality of pulley segments 152. The neutral position can be located between the first position and the second position. In some embodiments, the actuator system 130 may further comprise an electromagnetic actuator, such as one or more solenoids, voice coils end/or electromagnetic motors (not shown), for rotating the deflector 170 between at least the first position and the second position. The deflector 170 comprises an elongate body 174 extending between a root 176 and a distal tip 178. The deflector 170 is configured to rotate at the root 176, such that the distal tip 178 moves in a generally axial direction of the second pulley 142. The deflector 170'defines at least one cam surface. In the subject embodiment, the body 174 deflector defines an engaging cam surface 180 and a disengaging cam surface 182.

The engaging earn surface 180 and the disengaging cam surface 182 are located on opposite sides of the elongate body 174. The engaging cam surface 180 is configured to engage the plurality of followers 172 to move the plurality of pulley segments 152 from the disengaged region to the engaged region. In contrast, the disengaging cam surface 182 is configured to engage the plurality of followers 172 to move the plurality of pulley segments 152 from the engaged region to the disengaged region. As will be described below, the engaging cam surface 180 directs each of the followers 172 from an engaged position (shown in FIGS. 3a and 3b for follower 172a) to a disengaged position (shown in FIGS. 5a and 5b for follower 172a) during rotational operation of the second pulley 142. In contrast, the disengage cam surface 182 directs each of the followers 172 from the engaged position to the disengaged position during rotational operation of the second pulley 142.

The plurality of followers 172 is configured to move the plurality of pulley segments 152 between the engaged region and the disengaged region. Accordingly, each of the followers 172 is coupled to a respective one of the pulley segments 152. In the subject embodiment, each of the followers 172 comprises a body 184 and a protrusion 186 extending from the body 184. The body 184 is configured to couple the follower 172 to the respective one of the pulley segments 152. In some embodiments, body 184 is coupled to the pulley segment 152 by fasteners. In other embodiments, the body 184 is coupled to the pulley segment 152 by interlocking features, welding or other suitable mechanism. The protrusion 186 extends from the body 184 in a generally radial direction of the second pulley 142. The protrusion 186 is axially offset from the outer peripheral surface 150 of the second pulley 142. That is, the protrusion 186 is offset from the outer peripheral surface 150 in a direction aligned with the axis of rotation of the second pulley 142. The protrusion 186 is configured to engage the deflector 170 during rotational operation of the second pulley 142, to move the coupled pulley segment 152 between the engaged region and the disengaged region. In the subject embodiment, the protrusion 186 is a roller that is configured to contact the cam surfaces 180, 182 of the deflector 170 and roll therealong, to push the coupled pulley segment 152 between the engaged region and the disengaged region.

During rotational operation of the segmented pulley transmission 120, the endless member 128 will contact and engage the first pulley assembly 122 within an angular region defined as the contact zone. Conversely, the endless member 128 will not contact or engage the first pulley assembly 122 within an angular region defined as the non-contact zone. In FIGS. 1b to 5b, the non-contact zone is located adjacent the deflector 170 and extends generally from the second pulley assembly 124 to the idler pulley 126. The pulley segments 152 of the second pulley 142 can be moved into or out of the engaged region while positioned in the non-contact zone without interfering with the endless member 128 and while the segmented pulley transmission 120 is under load. As will be appreciated, the non-contact zone will vary depending on whether or not the first pulley 140 is engaged with the endless member 128 and which, if any, of the pulley segments 152 of the second pulley 142 are engaged with the endless member 128.

By sequentially moving the pulley segments 152 into or out of the engaged region while positioned in the non-contact zone, the endless member 128 may transition from engaging one of the first pulley 140 and the second pulley 142, defined as an "origin pulley," to engaging the other of the first pulley 140 and the second pulley 142, defined as a "destination pulley," without interrupting rotational operation of the segmented pulley transmission 120 and without interrupting a load transmitted through the segmented pulley transmission 120. Transition the endless member 128 between the origin pulley and the destination pulley is referred to as a "shift event."

FIGS. 1a, 1b to 5a, 5b show a sequence for transitioning one of the pulley segments 152a from the engaged region to the disengaged region, during a disengaging shift event. The disengaging shift event transitions the endless member 128 from the second pulley 142 to the first pulley 140, thereby disengaging the endless member 128 from the second pulley 142. As will be appreciated, the pulley segment 152a that is moving from the engaged region to the disengaged region in FIGS. 1a, 1b to 5a, 5b may be described as a transitioning pulley segment, and is one of the plurality of pulley segments 152 of the second pulley 142. Similarly, the follower 172a coupled to the transitioning pulley segment 152a may be described as a transitioning follower and is one of the plurality of followers 172. Prior to the disengaging shift event, the endless member 128 is engaged with the second pulley 142 and all of the pulley segments 152 are in the engaged region. In the subject embodiment, prior to the disengaging shift event, the deflector 170 is located in the first position (as shown in FIGS. 1a and 1b). In other embodiments, the deflector 170 is located in the neutral position prior to a shift event.

To begin the disengaging shift event, the deflector 170 moves to the second position as the first pulley assembly 122 rotates. In the subject embodiment, the deflector 170 starts in the first position (shown in FIGS. 1a and 1b) and passes through the neutral position (shown in FIGS. 2a and 2b), as the deflector 170 moves to the second position (shown in FIGS. 3a and 3b). The deflector 170 moves from the first position to the second position by rotating at the root 176. Rotation of the deflector 170 is timed such that the distal tip 178 of the deflector 170 passes between consecutive followers in the plurality of followers 172. In the subject embodiment, the distal tip 178 of the deflector 170 passes between the transitioning follower 172a and an immediately preceding one of the followers 172.

At the steps shown in FIGS. 3a and 3b to 5a and 5b, the deflector 170 is maintained in the first position. As the first pulley assembly 122 continues to rotate, the transitioning pulley segment 152a enters the non-contact zone and the transitioning follower 172a engages the deflector 170 to move the transitioning pulley segment 152a from the engaged region to the disengaged region. As will be appreciated, in the subject embodiment, the transitioning pulley segment 152a is moved out of the engaged region by retracting the transitioning pulley segment 152a out of the plane defined by the endless member 128. When the transitioning follower 172a engages the deflector 170, the protrusion 186 of the transitioning follower 172a contacts the disengaging cam surface 182 of the deflector 170 and the transitioning follower 172a is directed from the engaged position to the disengaged position as the first pulley assembly 122 rotates. As will be appreciated, when any one of the followers 172 is in the engaged position, the pulley segment 152 coupled to that follower 172 will be in the engaged region. In contrast, when any one of the followers 172 is in the disengaged position, the pulley segment 152 coupled to that follower will be in the disengage region. Accordingly, in the subject embodiment, as the transitioning follower 172a is directed from the engaged position to the disengaged position, the transitioning pulley segment 152a moves from the engaged region to the disengaged region. Once the transitioning pulley segment 152a is in the disengaged region and the transitioning follower 172a is in the disengaged position, the transitioning follower 172a disengages the deflector 170 and will no longer contact the deflector 170 as the first pulley assembly 122 continues to rotate. In the subject embodiment, the transitioning follower 172a disengaged the deflector 170 at or before passing the axis of rotation of the deflector 170 (as shown in FIG. 5a) during the disengaging shift event. As will be appreciated, by disengaging the deflector 170 at or before passing the axis of rotation thereof, the transitioning follower 172a can avoid applying a torque to the deflector 170 that would otherwise urge the deflector 170 out of the second position and back towards the first position, which could interfere with the disengaging shift event.

As will be appreciated, the steps shown in FIGS. 3a, 3b to 5a, 5b are repeated with the remaining followers 172 as the first pulley assembly 122 continues to rotate, to move the remaining pulley segments 152 from the engaged region to the disengaged region. Once all of the pulley segments 152 have been moved to the disengaged region, the disengaging shift event is complete and the endless member 128 will be engaged with the first pulley 140 for continuous rotational operation. In some embodiments, the deflector 170 is moved to the neutral position once the disengaging shift event is complete, to prepare for a subsequent shift event. In other embodiments, the deflector 170 remains in the second position once the disengaging shift event is complete.

To transition the endless member 128 from the first pulley 140 to the second pulley 142, a engaging shift event is carried out. At the outset of the engaging shift event, the deflector 170 moves to the first position (shown in FIGS. 1a and 1b) by rotating at the root 176. Again, rotation of the deflector 170 is timed such that the distal tip 178 of the deflector passes between consecutive follower in the plurality of followers.

As the first pulley assembly 122 continues to rotate, each of the pulley segments 152 sequentially enters the noncontact zone and is moved from the disengaged region to the engaged region. As will be appreciated, in the subject embodiment, each of the pulley segments 152 are moved into the engaged region by extending the pulley segments 152 into the plane defined by the endless member 128. When a pulley segment 152 is moving from the disengage region to the engaged region, that pulley segment 152 is defined as a transitioning pulley segment 152a and the follower 172 coupled to the transitioning pulley segment 152a is defined as a transitioning follower 172a. As the first pulley assembly 122 rotates, the transitioning follower 172a contacts the engaged cam surface 180 of the deflector 170 and the transitioning follower 172a is directed from the disengaged position to the engaged position. As the transitioning followers 172a is directed from the disengaged position to the engaged position, the transitioning pulley segment 152a moves from the disengaged region to the engaged region. Once the transitioning pulley segment 152 is in the engaged region and the transitioning follower 172a is in the engaged position, the transitioning follower 172a disengaged the deflector 170 and will no longer contact the deflector 170 as the first pulley assembly 122 continues to rotate. In some embodiments, the transitioning follower 172a disengaged the deflector 170 at or before passing the axis of rotation of the deflector 170 during the engaging shift event. As will be appreciated, by disengaging the deflector 170 at or before passing the axis of rotation thereof, the transitioning follower 172a can avoid applying a torque to the deflector 170 that would otherwise urge the deflector 170 out of the first position and back towards the second position, which could interfere with the engaging shift event.

As will be appreciated, the steps described above are repeated for each of the remaining followers 172 as the first pulley assembly 122 continues to rotate, to move each of the remaining pulley segments 152 from the disengaged region to the engaged region. Once all of the pulley segments 152 have been moved to the engaged region, the engaging shift event is complete and the endless member 128 will be engaged with the second pulley 142 for continuous rotational operation. In some embodiments, the deflector 170 is moved to the neutral position once the engaging shift event is complete, to prepare for a subsequent shift event. In other embodiments, the deflector 170 remains in the first position once the engaging shift event is complete.

Although the first pulley system 122 has been shown and described herein as comprising two concentric pulleys, namely the first pulley 140 and the second pulley 142, it will be appreciated that in other embodiments the first pulley system may comprise a greater number of concentric pulleys when further ratios for the segmented pulley transmission 120 are desired.

Although each of the followers 172 have been shown and described as comprising a body 184 coupled to a respective one of the pulley segments 152 and a protrusion 186 extending from the body 184, it will be appreciated that in other embodiments each of the followers may be integrally formed with a respective one of the pulley segments. As will be appreciated, in embodiments where the followers are integrally formed with the pulley segments, the body of each of the followers may be omitted and the protrusion may extend directly from the respective one of the pulley segments.

Although the protrusions 186 has been shown and described herein as a roller that is configured to contact the cam surfaces 180, 182 and roll therealong, it will be appreciated that in other embodiments the protrusion may be a slider that is configured to contact the cam surfaces and slide therealong. In some embodiments, the slider is made of plastic. In some embodiments the slide is made of nylon.

Although embodiments have been described above and are shown in the accompanying drawings, it will be appreciated by those skilled in the art that variations and modifications may be made without departing from the scope as defined by the appended claims, and the scope of the claims should be given the broadest interpretation consistent with the specification as a whole.

What is claimed is:

1. An actuator system for moving a plurality of pulley segments of a segmented pulley, the actuator system comprising:
- a deflector having a body that is rotatable between a first position and a second position, about a generally radial axis of rotation; and
- a plurality of followers coupled to the plurality of pulley segments such that each of the followers is coupled to a respective one of the pulley segments to move the respective one of the pulley segments between an engaged region and a disengaged region during rotational operation of the segmented pulley,
- wherein, in the first position, the deflector is aligned to engage the plurality of followers and direct each of the followers from a disengaged position to an engaged position during rotational operation of the segmented pulley, to move the plurality of pulley segments from the disengaged region to the engaged region,
- wherein, in the second position, the deflector is aligned to engage the plurality of followers and direct each of the followers from the engaged position to the disengaged position during rotational operation of the segmented pulley, to move the plurality of pulley segments from the engaged region to the disengaged region, and
- wherein each of the followers disengages the deflector at or before passing the axis of rotation of the deflector when moving the respective one of the pulley segments between the engaged region and the disengaged region during rotation operation of the segmented pulley.

2. The actuator system of claim 1, wherein each of the followers comprises a protrusion for contacting the deflector and a body for securing the follower to the respective one of the pulley segments, and wherein the protrusion extends from the body.

3. The actuator system of claim 2, wherein the protrusion of each of the followers extends in a generally radial direction of the segmented pulley and is axially offset from an outer peripheral surface of the segmented pulley.

4. The actuator system of claim 2, wherein the protrusion of each of the followers is a roller for engaging the deflector by rolling along the deflector.

5. The actuator system of claim 1, wherein the deflector is further rotatable to a neutral position, where the deflector will not engage the plurality of followers during rotation of the segmented pulley.

6. The actuator system of claim 5, wherein the neutral position is located between the first position and the second position.

7. The actuator system of claim 1, wherein the body of the deflector extends between a root and a distal tip, and wherein the deflector is rotatable at the root, such that the distal tip moves in a generally axial direction of the segmented pulley.

8. The actuator system of claim 7, wherein the distal tip of the deflector passes between a transitioning follower and an immediately preceding one of the followers, when the deflector moves between the first position and the second position.

9. The actuator system of claim 7, wherein the distal tip of the deflector moves from one side of the followers to an opposite side of the followers as the deflector moves between the first and second positions.

10. The actuator system of claim 1, further comprising an electromagnetic actuator for rotating the deflector between at least the first position and the second position.

11. The actuator system of claim 10, wherein the electromagnetic actuator comprises at least one solenoid.

12. A segmented pulley transmission for rotationally coupling a first rotatable member and a second rotatable member, the segmented pulley transmission comprising:
- a first pulley assembly for coupling to the first rotatable member, the first pulley assembly comprising a first pulley and a second pulley concentric with the first pulley, the second pulley being a segmented pulley having a plurality of pulley segments that are individually moveable between an engaged region and a disengaged region;
- a second pulley assembly for coupling to the second rotatable member and spaced apart from the first pulley assembly;
- an endless member engaging the first pulley assembly and the second pulley assembly and extending therebetween, to rotationally couple the first pulley assembly and the second pulley assembly; and
- an actuator system as defined in claim 1 and coupled to the plurality of pulley segments of the second pulley for selectively moving the plurality of pulley segments between the engaged region and the disengaged region.

13. The segmented pulley transmission of claim 12, further comprising an idler pulley for engaging the endless member and controlling slack in the endless member.

14. The segmented pulley transmission of claim 12, wherein each of the followers is integrally formed with the respective one of the pulley segments.

15. The actuator system of claim 1, wherein the deflector comprises an engaging cam surface that contacts the plurality of followers to direct each of the followers from the disengaged position to the engaged position during rotational operation of the segmented pulley.

16. The actuator system of claim 15, wherein the deflector further comprises a disengaging cam surface that contacts the plurality of followers to direct each of the followers from the engaged position to the disengaged position during rotational operation of the segmented pulley, and wherein the engaging cam surface and the disengaging cam surface are located on opposite sides of the body.

* * * * *